US011673276B2

(12) United States Patent
Wang et al.

(10) Patent No.: US 11,673,276 B2
(45) Date of Patent: Jun. 13, 2023

(54) SUCTION ASSEMBLY AND SUCTION DEVICE HAVING SUCTION ASSEMBLY

(71) Applicant: TRIPLE WIN TECHNOLOGY(SHENZHEN) CO. LTD., Shenzhen (CN)

(72) Inventors: Yun-Feng Wang, Shenzhen (CN); Yen-Sheng Lin, New Taipei (TW)

(73) Assignee: TRIPLE WIN TECHNOLOGY(SHENZHEN) CO. LTD., Shenzhen (CN)

( * ) Notice: Subject to any disclaimer, the term of this patent is extended or adjusted under 35 U.S.C. 154(b) by 310 days.

(21) Appl. No.: 17/121,600

(22) Filed: Dec. 14, 2020

(65) Prior Publication Data

US 2022/0152844 A1  May 19, 2022

(30) Foreign Application Priority Data

Nov. 19, 2020 (CN) .......................... 202011303441.0

(51) Int. Cl.
*B25J 15/06* (2006.01)
*B25J 15/00* (2006.01)
*B25J 9/02* (2006.01)

(52) U.S. Cl.
CPC ....... *B25J 15/0625* (2013.01); *B25J 15/0052* (2013.01); *B25J 9/026* (2013.01)

(58) Field of Classification Search
CPC .... B25J 15/0625; B25J 15/0052; B25J 9/026; B65G 47/912; B65G 47/91; B65G 47/911; B65G 47/918; B65G 2203/041
See application file for complete search history.

(56) References Cited

U.S. PATENT DOCUMENTS

| 4,950,011 A * | 8/1990 | Borcea | H05K 13/0408 |
| | | | 294/183 |
| 5,193,776 A * | 3/1993 | Nagai | B65G 47/91 |
| | | | 248/309.3 |
| 8,418,522 B1 * | 4/2013 | Liao | B21D 1/06 |
| | | | 72/457 |
| 9,808,933 B2 * | 11/2017 | Lin | B25J 15/0616 |
| 10,011,022 B1 * | 7/2018 | Lin | B25J 15/0061 |

(Continued)

FOREIGN PATENT DOCUMENTS

| KR | 20110089667 A * | 8/2011 |
| TW | 200529997 A | 9/2005 |

(Continued)

*Primary Examiner* — Stephen A Vu
(74) *Attorney, Agent, or Firm* — ScienBiziP, P.C.

(57) ABSTRACT

A suction assembly includes a main body, a sealing ring, an air duct, and a suction head. The main body includes a columnar wall, a top cover arranged at one end of the columnar wall and defining a first through hole, and a bottom cover arranged at another end of the columnar wall and defining a second through hole. The first through hole communicates with a negative pressure generating device. The sealing ring is sealed in the main body and movably arranged between the top cover and the bottom cover. The air duct includes a first end and a second end opposite the first end. The first end passes through the second through hole and is fixed in the sealing ring. The suction head is coupled to the second end.

14 Claims, 7 Drawing Sheets

(56) References Cited

U.S. PATENT DOCUMENTS

| | | | |
|---|---|---|---|
| 2009/0193642 A1* | 8/2009 | Lin | B25J 15/0061 29/428 |
| 2016/0076563 A1* | 3/2016 | Cho | F15B 15/262 92/17 |
| 2020/0048014 A1 | 2/2020 | Nakayama et al. | |

FOREIGN PATENT DOCUMENTS

| | | |
|---|---|---|
| TW | 201130726 A | 9/2011 |
| TW | M597276 U | 6/2020 |
| TW | I702197 B | 8/2020 |

* cited by examiner

SUCTION ASSEMBLY AND SUCTION DEVICE HAVING SUCTION ASSEMBLY

FIELD

The subject matter herein generally relates to suction devices, and more particularly to a suction device having a suction assembly.

BACKGROUND

In production, vacuum suction is widely used to transfer products. The existing suction nozzle has a rigid contact with the product, which leads to poor adaptability of the suction nozzle to different types of products, and it is easy to cause damage to the product during a process of suction and discharge, especially if a surface of the product is not flat.

BRIEF DESCRIPTION OF THE DRAWINGS

Implementations of the present disclosure will now be described, by way of embodiments, with reference to the attached figures.

DETAILED DESCRIPTION

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series, and the like.

Figure 1:
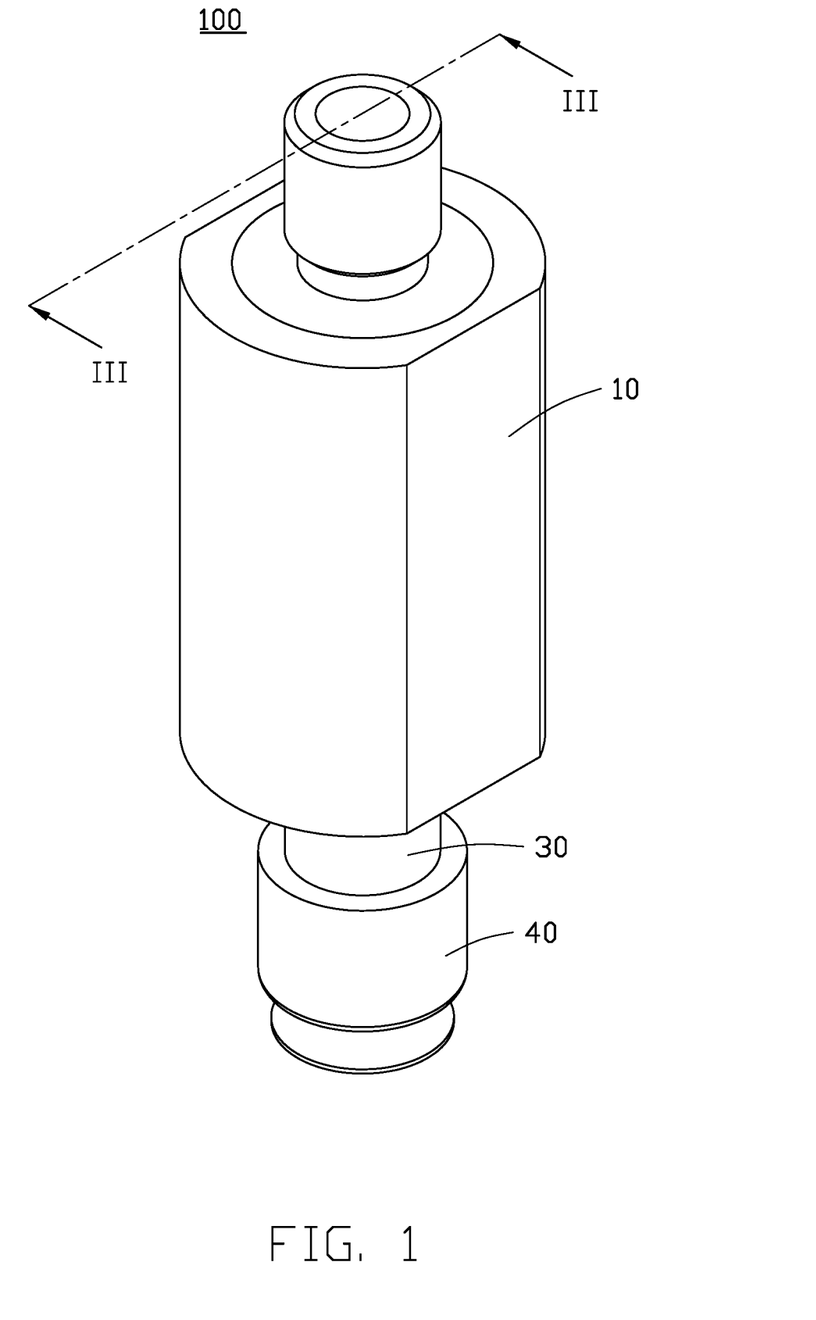
FIG. 1 is a perspective schematic diagram of an embodiment of a suction assembly.
Figure 2:
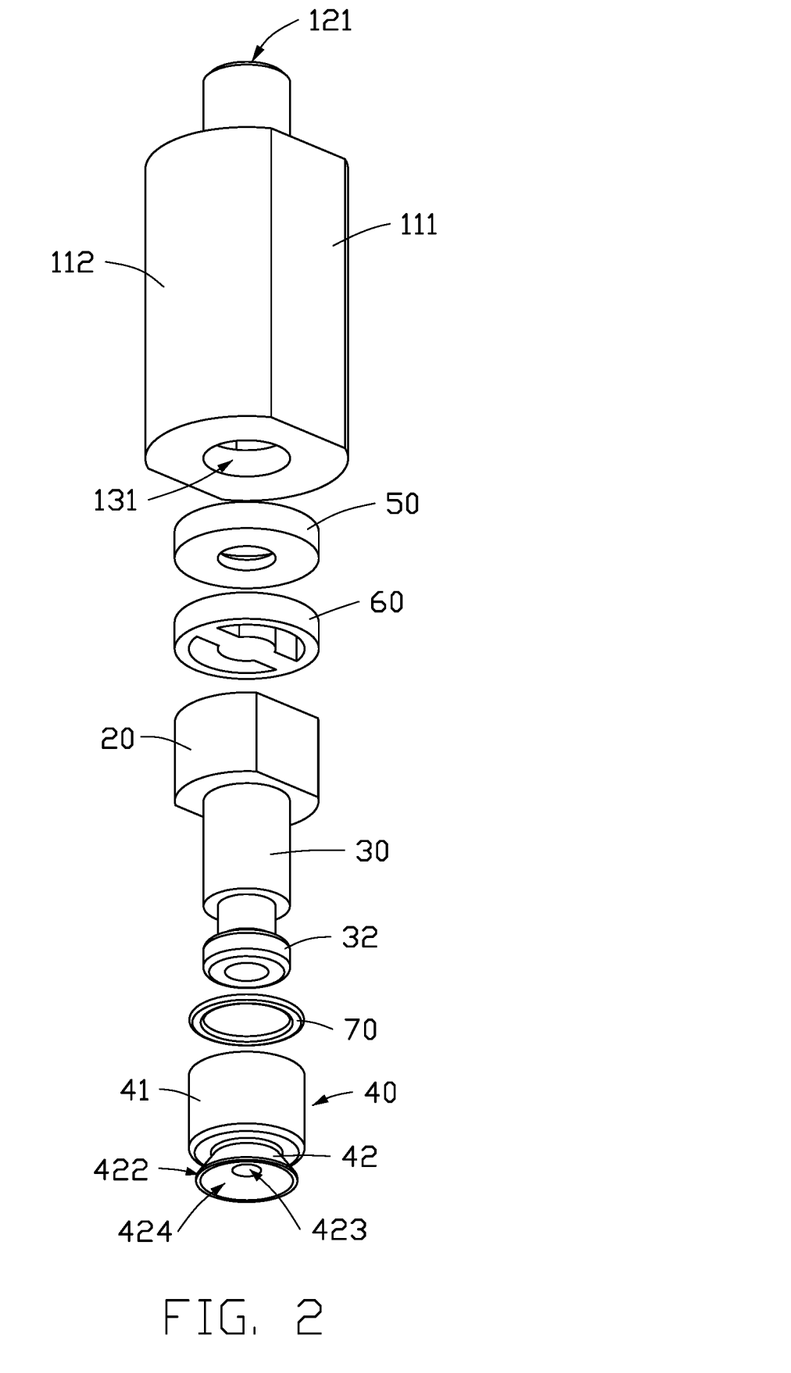
FIG. 2 is an exploded view of the suction assembly shown in FIG. 1.
Figure 3:
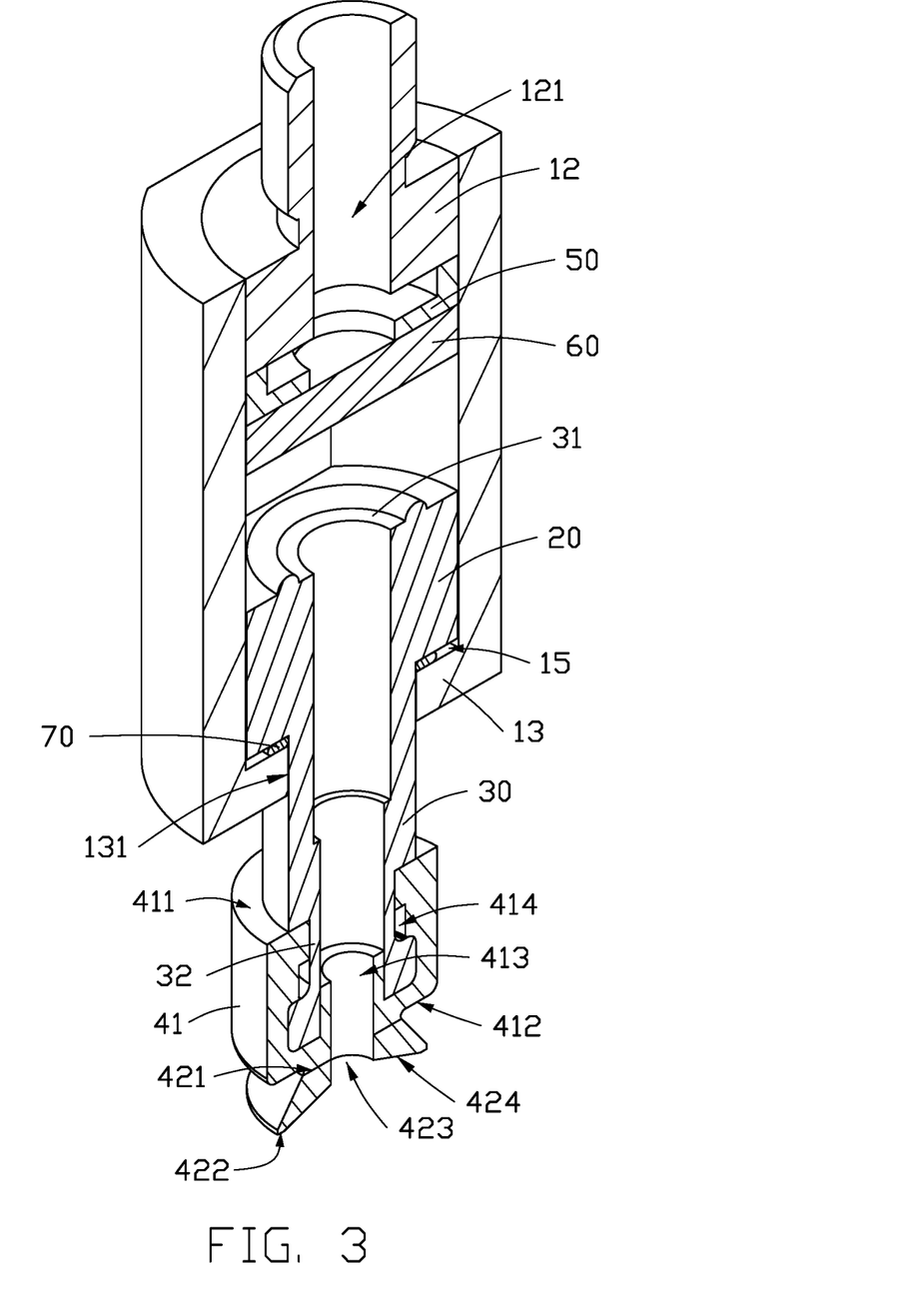
FIG. 3 is a cutaway view of the suction assembly shown in FIG. 1 taken along line III-III.

FIGS. 1-3 show an embodiment of a suction assembly 100. The suction assembly 100 includes a main body 10, a sealing ring 20, an air duct 30, and a suction head 40.

The main body 10 includes a columnar wall 11, a top cover 12, and a bottom cover 13. The top cover 12 is arranged on one end of the columnar wall 11, and the bottom cover 13 is arranged on another end of the columnar wall 11. The top cover 12 defines a first through hole 121, and the bottom cover 13 defines a second through hole 131. The first through hole 121 is used to communicate with a negative pressure generating device (not shown). The negative pressure generating device is used to extract air from the main body 10 through the first through hole 121.

The sealing ring 20 is received in the main body 10. The sealing ring 20 is movable between the top cover 12 and the bottom cover 13. An outer side of the sealing ring 20 and the columnar wall 11 are sealed, and the sealing ring 20 divides the main body 10 into a negative pressure zone 14 and a normal pressure zone 15. The negative pressure zone 14 is in communication with the negative pressure generating device through the first through hole 121. The normal pressure zone 15 is in communication with the outside through the second through hole 131.

The air duct 30 includes a first end 31 and a second end 32 opposite to the first end 31. The first end 31 passes through the second through hole 131 and is fixed in an inner hole of the sealing ring 20. The suction head 40 is coupled to the second end 32.

In use, the suction assembly 100 is moved to a top of a product (such as an electronic component), and then slowly lowered until the suction head 40 contacts a surface of the product. Because the sealing ring 20 is movably arranged in the main body 10, a contact between the suction head 40 and the product is a flexible contact rather than a rigid contact, thereby reducing damage to the product. At the same time, the flexible contact can make the suction head 40 suitable for suctioning products with uneven surfaces or different types and sizes.

Then, the negative pressure generating device is activated, and the negative pressure generating device draws out the air from the main body 10, so that a negative pressure is formed between the suction head 40 and the surface of the product, so that the suction head 40 is suctioned to the product stably. Finally, the suction assembly 100 holding the product is moved to above a predetermined position, the negative pressure generating device is turned off, and air enters the main body 10 through the first through hole 121, then the negative pressure between the suction head 40 and the surface of the product disappears, and the product falls to the predetermined position.

In one embodiment, the suction assembly 100 further includes a one-way valve 50. The one-way valve 50 is arranged on a side of the top cover 12 facing the sealing ring 20. The one-way valve 50 is used for preventing gas from entering the main body 10 through the first through hole 121.

In use, when the negative pressure generating device is closed, the one-way valve 50 prevents gas from entering the negative pressure zone 14 through the first through hole 121, so that an air pressure in the negative pressure zone 14 will not change too quickly and cause the product to fall quickly, which is beneficial to protect the product from damage.

In one embodiment, the suction assembly 100 further includes a first cushion 60 and a second cushion 70. The first cushion 60 is arranged on a side of the one-way valve 50 facing the sealing ring 20. The first cushion 60 is used to reduce an impact of the one-way valve 50 on the sealing ring 20. The second cushion 70 is arranged on a side of the bottom cover 13 facing the sealing ring 20. The second cushion 70 is used to reduce an impact force between the sealing ring 20 and the bottom cover 13. The first cushion 60 and the second cushion 70 can be made of elastic materials.

In one embodiment, the suction head 40 includes a connecting portion 41 and a suction cup 42. The connecting portion 41 includes a first surface 411 and a second surface 412 opposite the first surface 411. The connecting portion 41 is provided with a third through hole 413. The third through hole 413 penetrates the first surface 411 and the second surface 412, and the third through hole 413 is in communication with a hole of the air duct 30.

The suction cup 42 includes a third surface 421 and a fourth surface 422 opposite the third surface 421. The suction cup 42 is provided with a fourth through hole 423, and the fourth through hole 423 penetrates the surface third surface 421 and the fourth surface 422. The suction cup 42 is substantially in the shape of a truncated cone, and a forward projection of the third surface 421 on the fourth surface 422 is located in the fourth surface 422.

The third surface 421 is coupled to the second surface 412. The third through hole 413 is in communication with the fourth through hole 423. The fourth surface 422 is recessed toward the third surface 421 to define a suction groove 424. The suction groove 424 is used for suctioning the product.

In one embodiment, the first surface 411 is recessed toward the second surface 412 to define a receiving groove 414. A bottom of the receiving groove 414 is in communication with the third through hole 413, and the second end 32 is fixed in the receiving groove 414.

In one embodiment, the suction head 40 is made of silica gel, which has the advantages of not being easily deformed and damaged, which can reduce a frequency of replacement and reduce the risk of dropping the product.

In one embodiment, the columnar wall 11 includes two first side walls 111 and two second side walls 112. The two first side walls 111 are arranged opposite each other, and the two second side walls 112 are coupled to an edge of the two first side walls 111. The first side walls 111 are flat, and the second side walls 112 are curved.

Figure 4:
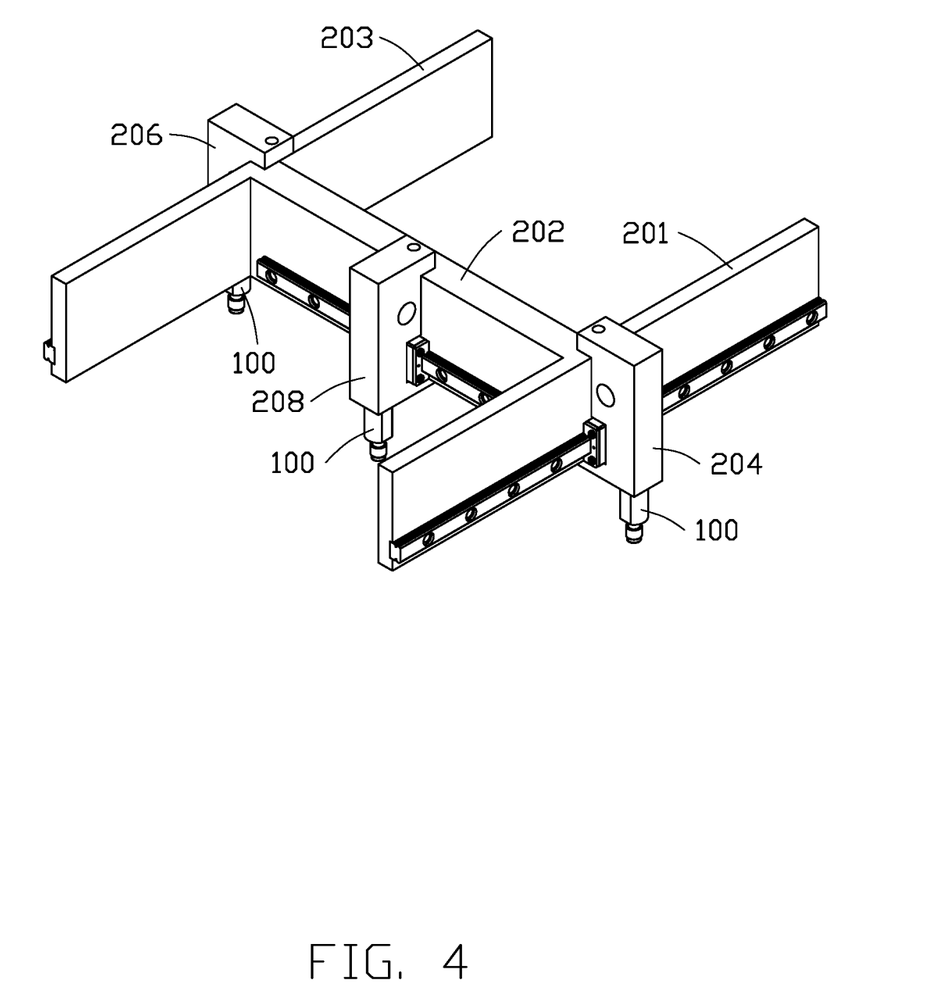
FIG. 4 is a perspective schematic diagram of an embodiment of a suction device.

FIG. 4 shows an embodiment of a suction device 200. The suction device 200 includes a first moving guide rail 201, a second moving guide rail 202, a third moving guide rail 203, and a plurality of suction assemblies 100 as described above. The second moving guide rail 202 is coupled to the first moving guide rail 201 and the third moving guide rail 203. The suction assemblies 100 are movably arranged on the first moving guide rail 201, the second moving guide rail 202, and the third moving guide rail 203.

In one embodiment, the suction device 200 further includes a first slider 204, a second slider 205, and a third slider 206. The first slider 204 is movably arranged on the first moving guide rail 201, and a first suction assembly 100 is arranged on one side of the first slider 204. The second slider 205 is movably arranged on the second moving guide rail 202, and a second suction assembly 100 is arranged on one side of the second slider 205. The third slider 206 is movably arranged on the third moving guide rail 203, and a third suction assembly 100 is arranged on one side of the third slider 206. The suction heads 40 of the three suction assemblies 100 face a same direction.

In one embodiment, the second moving guide rail 202 is perpendicularly coupled between the first moving guide rail 201 and the third moving guide rail 203.

Figure 5:
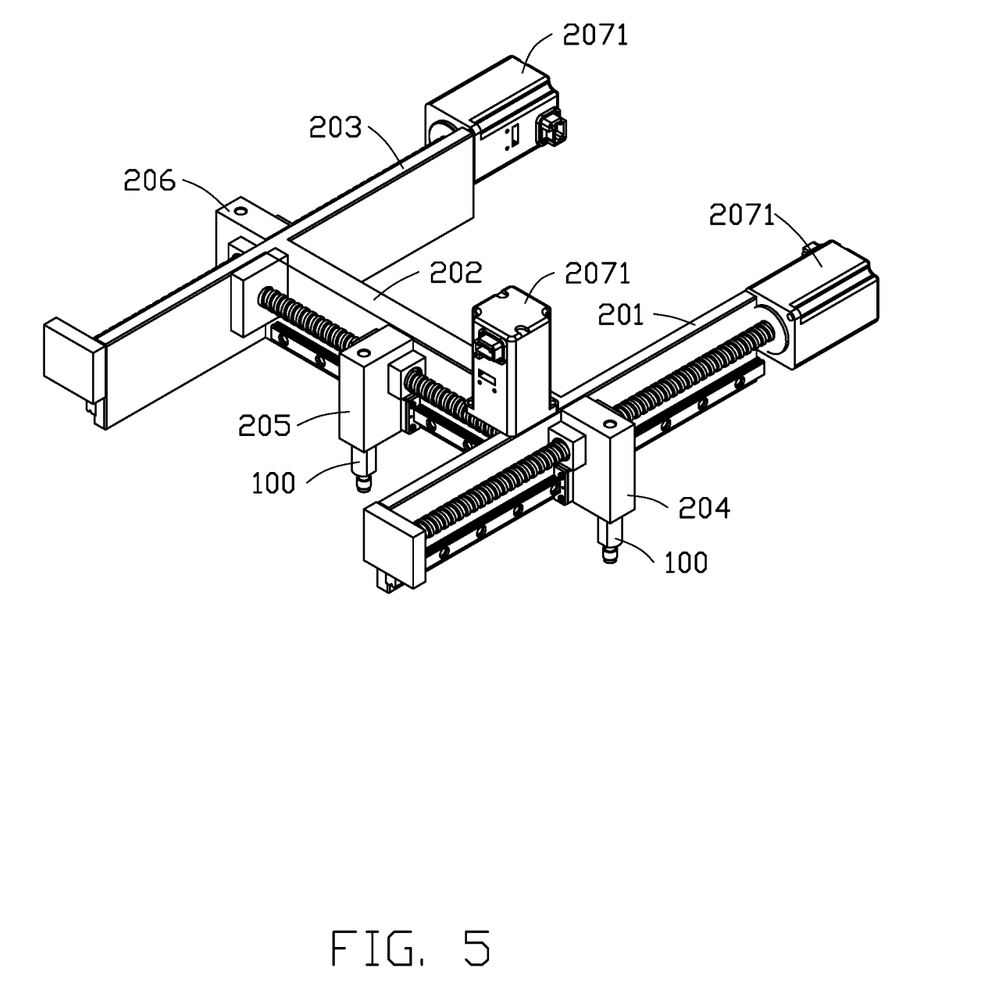
FIG. 5 is a perspective schematic diagram of the suction device shown in FIG. 4 with a motor installed.
Figure 6:
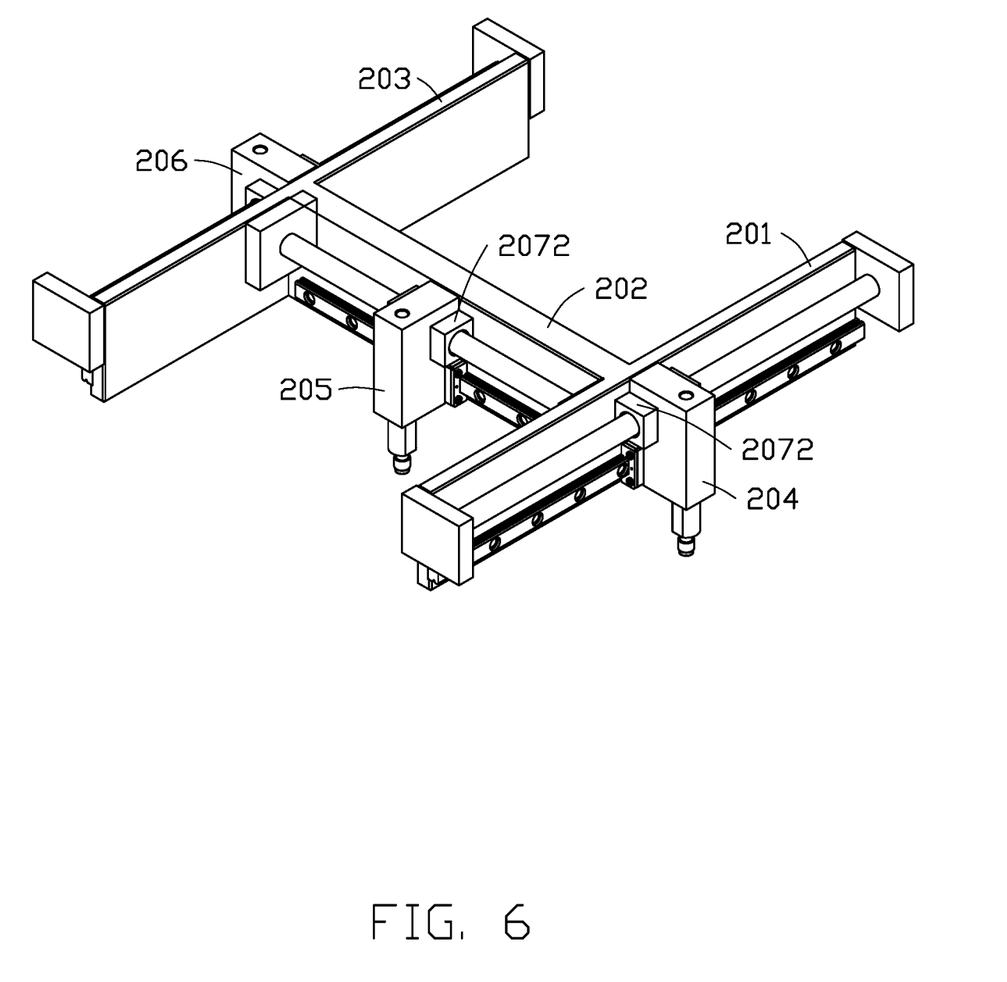
FIG. 6 is a perspective schematic diagram of the suction device shown in FIG. 4 with a cylinder installed.

In one embodiment, the suction device 200 further includes a plurality of drivers 207, and each driver 207 drivingly coupled to a corresponding one of the suction assemblies 100. Each driver 207 includes a motor 2071 (shown in FIG. 5). In other embodiments, each driver 207 includes a cylinder 2072 (shown FIG. 6).

Figure 7:
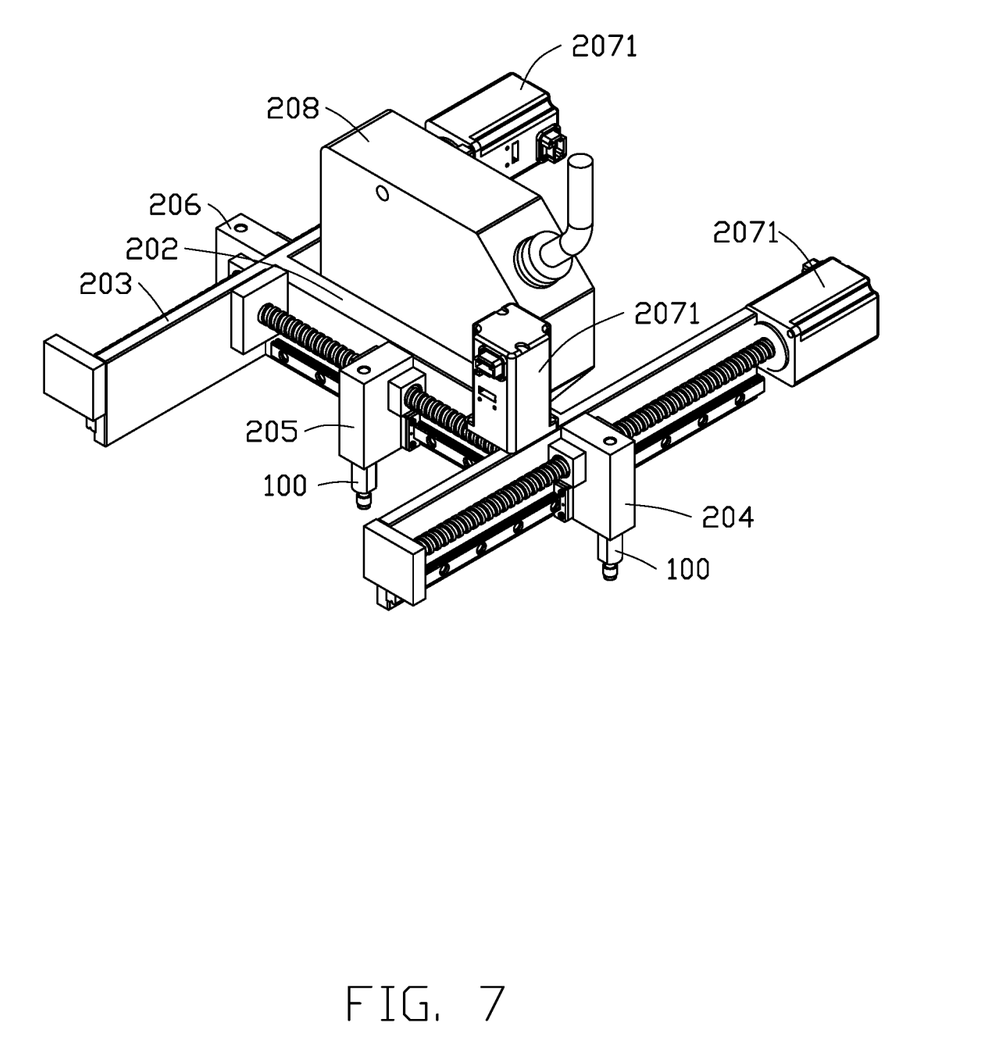
FIG. 7 is a perspective schematic diagram of the suction device shown in FIG. 6 with a recognition camera installed.

Referring to FIG. 7, in one embodiment, the suction device 200 further includes a recognition camera 208 and a controller (not shown). The recognition camera 208 is arranged on the second moving guide rail 202, and the controller is electrically coupled to the recognition camera 208 and the drivers 207. The recognition camera 208 is used to record contour information of the product and send the contour information to the controller. The controller controls the drivers 207 to move the corresponding suction assemblies 100 to a predetermined position according to the contour information.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A suction assembly comprising:
a main body comprising a columnar wall, a top cover, and a bottom cover, the top cover arranged at one end of the columnar wall, the bottom cover arranged at another end of the columnar wall, the top cover provided with a first through hole, the bottom cover provided with a second through hole, the first through hole used to communicate with a negative pressure generating device;
a sealing ring sealed in the main body and movably arranged between the top cover and the bottom cover;
an air duct comprising a first end and a second end opposite the first end, the first end passing through the second through hole and fixed in the sealing ring;
a suction head coupled to the second end; and
a one-way arranged on a side of the top cover facing the sealing ring, the one-way valve configured to prevent gas from entering the main body through the first through hole.

2. The suction assembly of claim 1, further comprising a first cushion and a second cushion, wherein:
the first cushion is arranged on a side of the one-way valve facing the sealing ring; and
the second cushion is arranged on a side of the bottom cover facing the sealing ring.

3. The suction assembly of claim 1, wherein:
the suction head comprises a connecting portion and a suction cup coupled to the connecting portion;
the connecting portion is provided with a third through hole in communication with the air duct;
the suction cup is provided with a fourth through hole penetrating the suction cup;
the third through hole is in communication with the fourth through hole;
a surface of the suction cup away from the connecting portion is recessed to define a suction groove; and
the suction groove is configured to suction a product.

4. The suction assembly of claim 3, wherein:
a side of the connecting portion away from the suction cup is recessed to define a receiving groove;

a bottom of the receiving groove is in communication with the third through hole; and the second end is fixed in the receiving groove.

5. The suction assembly of claim 4, wherein:

the suction head is made of silica gel.

6. The suction assembly of claim 1, wherein:

the columnar wall comprises two first side walls and two second side walls;

the two first side walls are arranged opposite each other, and the two second side walls are coupled to edges of the first side walls; and the first side walls are flat, and the second side walls are curved.

7. A suction device comprising:

a first moving guide rail;

a third moving guide rail;

a second moving guide rail coupled to the first moving guide rail and the third moving guide rail;

a plurality of suction assemblies, each of the plurality of suction assemblies movably arranged on a corresponding one of the first moving guide rail, the second moving guide rail, and the third moving guide rail;

a plurality of drivers, each of the plurality of drivers coupled to a corresponding one of the plurality of suction assemblies, each of the plurality of drivers comprising at least one of a motor and a cylinder;

a recognition camera arranged on the second moving guide rail, the recognition camera configured to record contour information of a product, the drivers controlled to move the corresponding suction assemblies to a predetermined position according to the contour information.

8. The suction device of claim 7, wherein each of the plurality of suction assemblies comprises:

a main body comprising a columnar wall, a top cover, and a bottom cover, the top cover arranged at one end of the columnar wall, the bottom cover arranged at another end of the columnar wall, the top cover provided with a first through hole, the bottom cover provided with a second through hole, the first through hole used to communicate with a negative pressure generating device;

a sealing ring sealed in the main body and movably arranged between the top cover and the bottom cover;

an air duct comprising a first end and a second end opposite the first end, the first end passing through the second through hole and fixed in the sealing ring; and a suction head coupled to the second end.

9. The suction device of claim 8, wherein:

each of the plurality of suction assemblies further comprises a one-way valve;

the one-way valve is arranged on a side of the top cover facing the sealing ring; and the one-way valve is configured to prevent gas from entering the main body through the first through hole.

10. The suction device of claim 9, further comprising a first cushion and a second cushion, wherein:

the first cushion is arranged on a side of the one-way valve facing the sealing ring; and the second cushion is arranged on a side of the bottom cover facing the sealing ring.

11. The suction device of claim 10, wherein:

the suction head comprises a connecting portion and a suction cup coupled to the connecting portion;

the connecting portion is provided with a third through hole in communication with the air duct;

the suction cup is provided with a fourth through hole penetrating the suction cup;

the third through hole is in communication with the fourth through hole;

a surface of the suction cup away from the connecting portion is recessed to define a suction groove; and the suction groove is configured to suction a product.

12. The suction device of claim 11, wherein:

a side of the connecting portion away from the suction cup is recessed to define a receiving groove;

a bottom of the receiving groove is in communication with the third through hole; and the second end is fixed in the receiving groove.

13. The suction device of claim 12, wherein:

the suction head is made of silica gel.

14. The suction device of claim 13, wherein:

the columnar wall comprises two first side walls and two second side walls;

the two first side walls are arranged opposite each other, and the two second side walls are coupled to edges of the first side walls; and the first side walls are flat, and the second side walls are curved.

* * * * *